Oct. 26, 1943.　　　E. G. ROEHM　　　2,332,533
TRACER MECHANISM
Filed Sept. 2, 1941　　　4 Sheets-Sheet 2

INVENTOR.
ERWIN G. ROEHM
BY
A. H. Parsons
ATTORNEY.

Patented Oct. 26, 1943

2,332,533

UNITED STATES PATENT OFFICE 2,332,533

TRACER MECHANISM

Erwin G. Roehm, Norwood, Ohio, assignor to The Cincinnati Milling Machine Co., Cincinnati, Ohio, a corporation of Ohio Application September 2, 1941, Serial No. 409,171

20 Claims. (Cl. 90—62)

This invention relates to automatic profiling machines and more particularly to improvements in tracer control mechanisms therefor.

One of the objects of this invention is to simplify and improve the means for controlling automatic operation of a profiling machine with a deflectable tracer.

Another object of this invention is to provide an improved tracer control mechanism for hydraulically operated profiling machines.

A further object of this invention is to provide an improved tracer control mechanism for continuous 360 degree profiling operations.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

Figure 1:
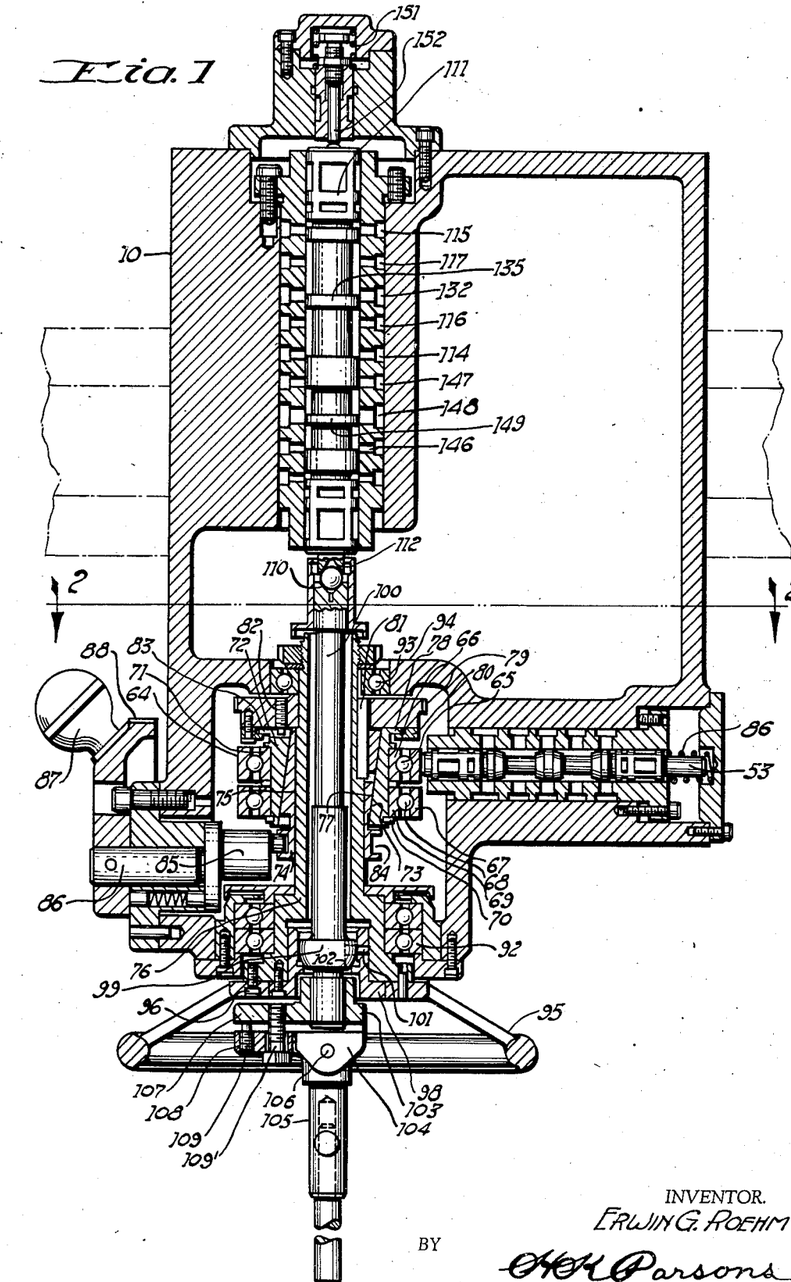
Figure 1 is a vertical section through the tracer head.
Figures 2, 5, 6:
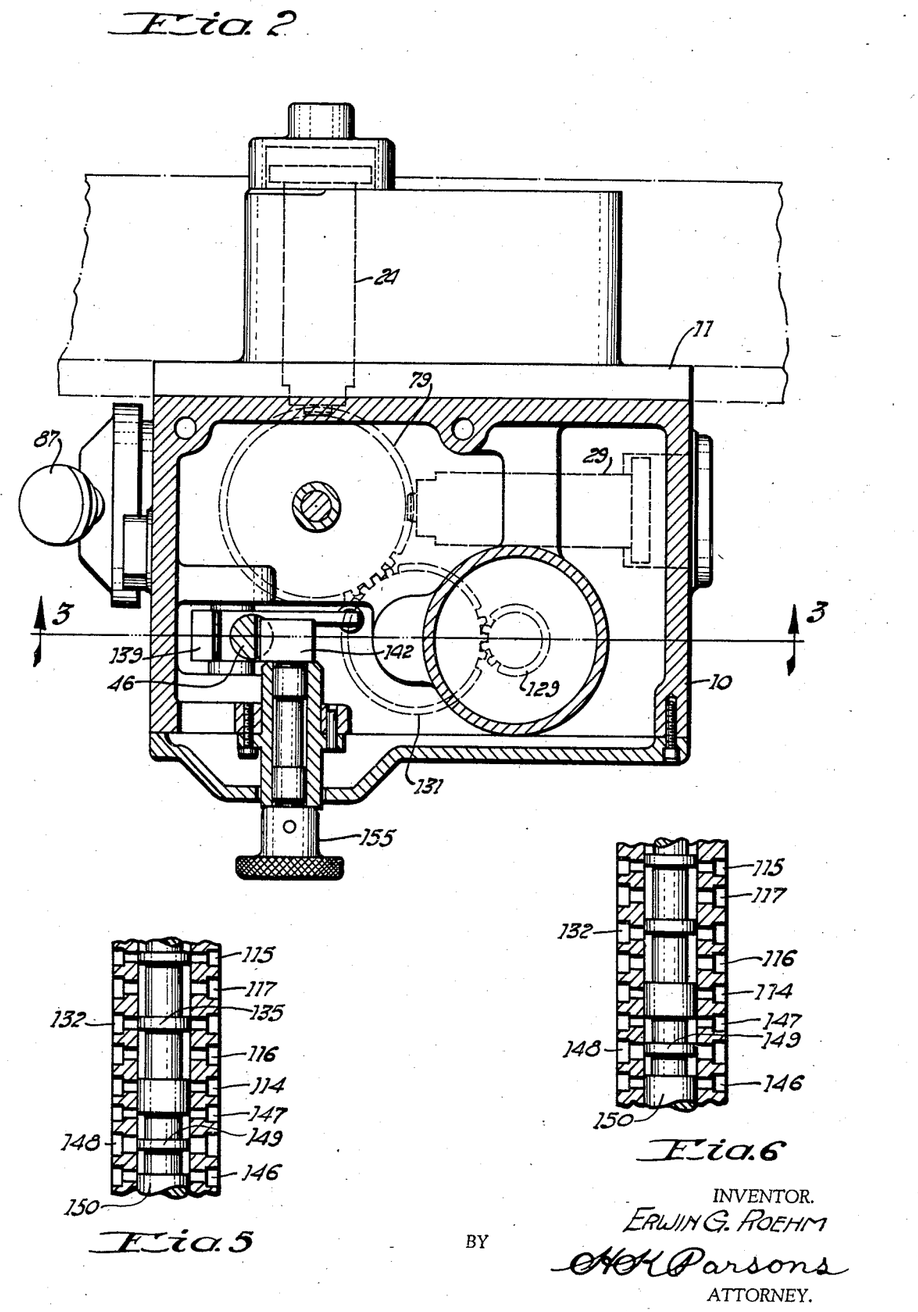
Figure 2 is a section on the line 2—2 of Figure 1.
Figures 5 and 6 are views showing different positions of the tracer control valve.
Figure 3:
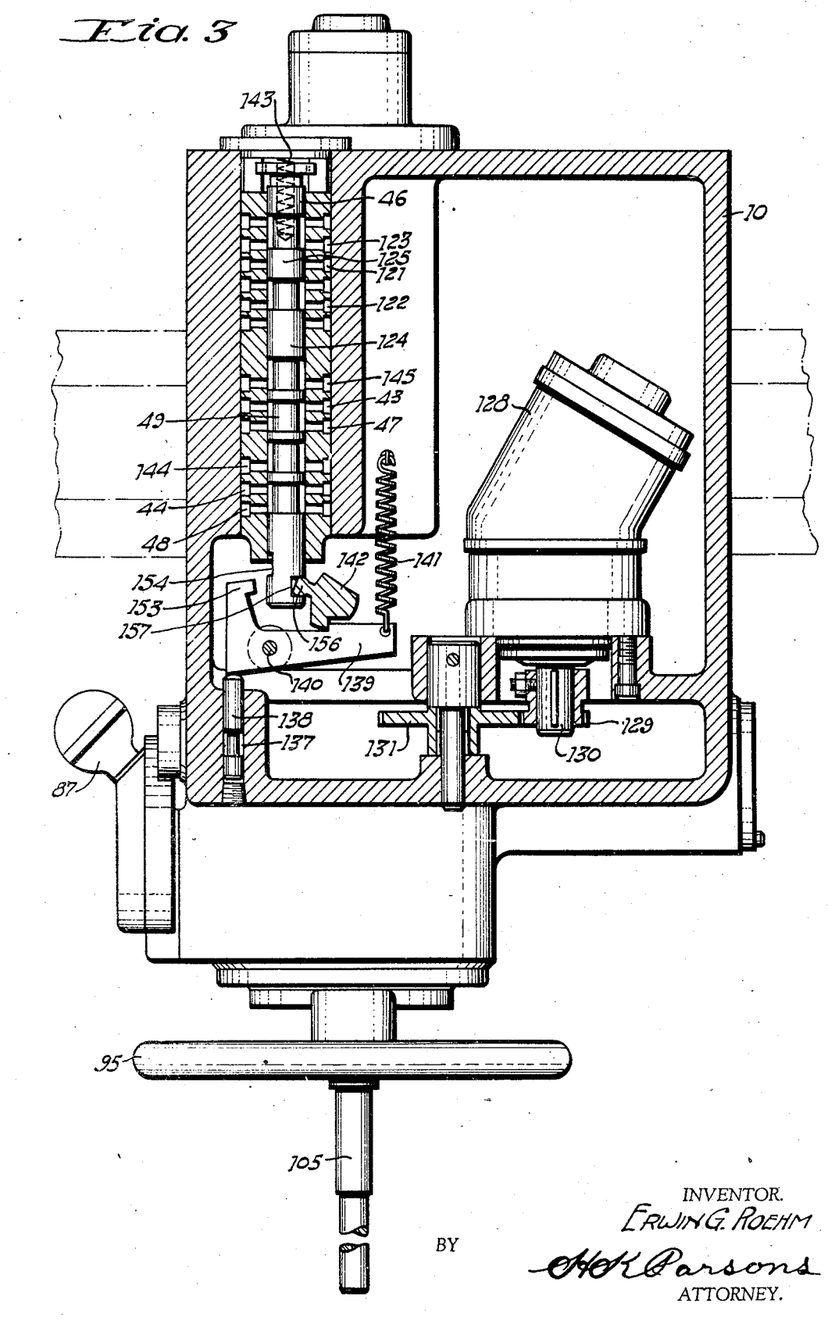
Figure 3 is a vertical section on the line 3—3 of Figure 2.

The tracer control mechanism of this invention is designed to be built as a unit, all of the parts being mounted in a single housing or casing 10 as shown in Figures 1, 2 and 3 of the drawings, which casing has guide surfaces 11 by means of which it may be mounted on the tracer supporting arm of a profiling machine of the general type disclosed in U. S. Patents Nos. 2,068,889 and 2,239,625. These machines have a work support and a tool support which are relatively movable in transverse directions whereby universal movement in a plane may be accomplished, rendering them suitable for profiling operations involving 360 degree movement about a pattern. The two slides of these machines are actuated by hydraulic devices in the form of motors of the piston and cylinder type, and the tracer control mechanism of this invention is designed to automatically control the pressures in these devices in such co-ordinated manner that a cutting tool can be automatically directed along a prescribed path dictated by the profile of a pattern in contact with the tracer and through a complete 360 degree circuit if such is necessary.

Figure 4:
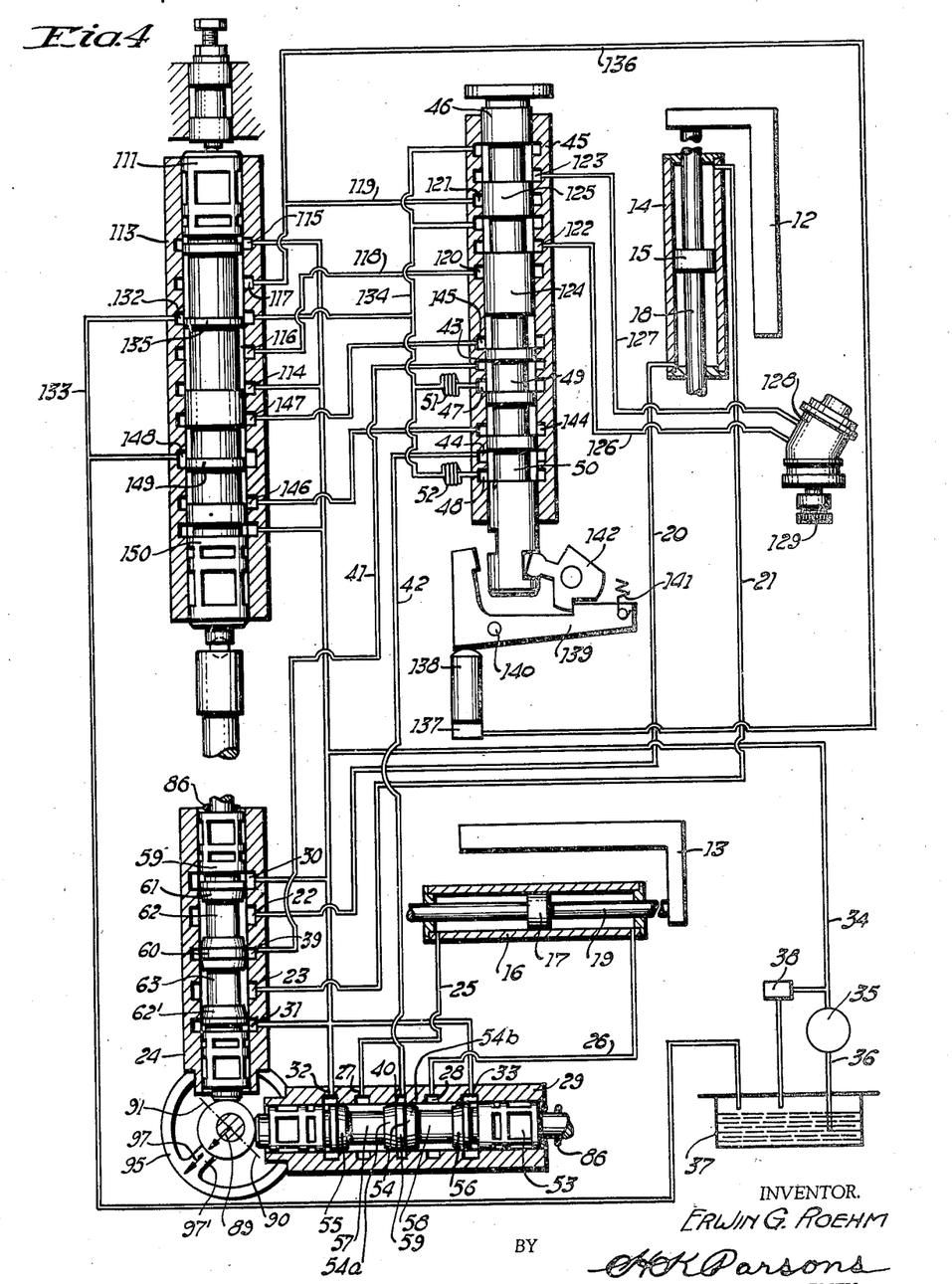
Figure 4 is a diagrammatic view of the hydraulic control circuit.

The piston and cylinder motors for the two transversely movable slides are indicated diagrammatically in Figure 4 by the reference numerals 12 and 13 and comprise a cylinder 14 and a contained piston 15 for the slide 12 and a cylinder 16 and contained piston 17 for the slide 13. The piston 15 is connected by a piston rod 18 to the slide 12 while the piston 17 is connected by a piston rod 19 to the slide 13. For the purposes of this invention it is preferable that the piston rods extend through both ends of the cylinder, thus making the pressure areas on each side of the piston equal whereby equal pressures in opposite ends of a cylinder will hold the contained piston against movement. Differential pistons could be utilized by using compensating cylinders without departing from the principles of this invention.

The opposite ends of cylinder 14 are connected by channels 20 and 21 to ports 22 and 23 of a control valve 24. Similarly, the opposite ends of cylinder 16 are connected by channels 25 and 26 to ports 27 and 28 of a control valve 29. The control valves 24 and 29 are combination reversing and throttle valves in that they serve to change the direction of movement and are provided with tapered throttling spools which simultaneously throttle the flow to the cylinder as well as from the cylinder, thus creating a variable back pressure at all times and it is the amount of differential between the forward pressure and the back pressure which determines the rate of movement of the piston.

The valve 24 has two pressure ports 30 and 31 and the valve 29 has two pressure ports 32 and 33 and all four of these pressure ports are connected to a common supply line 34 which is continuously maintained under constant pressure by a pump 35. This pump has an intake 36 through which fluid is withdrawn from a reservoir 37 and a relief valve 38 which is connected to the supply line 34 for controlling and maintaining the pressure constant.

The valve 24 has an exhaust port 39 and the valve 29 has an exhaust port 40, these ports being connected by channels 41 and 42 to ports 43 and 44 of a selector valve 45. The plunger 46 of this valve has two positions, one of which is known as the manual control position and the other of which is known as the automatic profiling position. The plunger is shown in Figure 4 in its upper position which is the manual control position and in which the ports 43 and 44 are connected to ports 47 and 48 respectively by the annular grooves 49 and 50 formed in the plunger 46.

The ports 47 and 48 are connected to the reservoir 37 through hydraulic resistances 51 and 52 respectively. For the purposes of explanation it may be assumed that the support 13 represents the work table of a machine and the support 12 represents the tool support which is movable transversely to the direction of movement of the work support. The valve 29 which controls operation of the support 13 is mounted in the housing 10 parallel to the direction of movement of the support 13 and contains a plunger 53 having a double tapered central throttle spool 54 separated from tapered end throttle spools 55 and 56 by annular grooves 57 and 58. The spool 54 has an annular cylindrical surface 59 which is of a width equal to the port groove 40 whereby this port is closed when the valve plunger is in a central position.

The spools 55 and 56 are also provided with annular cylindrical surfaces which close the pressure ports 32 and 33 when the plunger is in a central position.

Thus, in the central position of the plunger, the pressure and exhaust ports are closed locking the fluid in both ends of the cylinder which stops the piston. The valve plunger is shifted to either side of the control position to select direction. At the same time the throttle spools open a pressure port and an exhaust port, causing a drop in pressure in the incoming fluid which forces the fluid behind the piston through the exhaust throttle spool, creating a back pressure in the cylinder.

Thus, the fluid entering port 32, for instance, flows through the resistance caused by the tapered throttle spool 55 producing a drop in pressure in the line 25 as respects the pump pressure. Advance of the piston 17 forces the fluid in the other end of the cylinder through line 26 and the resistance offered by the tapered throttle spool 54b to line 42. Thus, the piston always works against a back pressure which prevents inadvertent advance thereof and makes it possible to perform climb cutting operations, which are those in which the cutting teeth move in the same direction as the feed.

When the valve is shifted to the other side of center, the throttling spools 54a and 56 function to control the back pressure and forward pressure respectively.

The valve 24 which controls the operation of piston 15 operates on the same principle as valve 29 and is mounted in the tracer casing parallel to the direction of movement of the slide 12 and in 90 degree phase relation to the valve 29. Briefly, the valve 24 has a plunger 59 upon which is formed a central double tapered throttle spool 60, and tapered throttle spools 61 and 62' spaced from the central spool by annular grooves 62 and 63. These tapered spools form resistances at the respective ports and thus control the pressure differential in the cylinder 14.

The two plungers are connected in phase relation for control by circular cam means which are eccentrically supported on a rotatable tracer head.

Referring to Figure 1 a circular cam 64 is supported by anti-friction members 65 on a race member 66 for controlling the movement of plunger 53, and a second cam 67 is similarly supported by anti-friction members 68 on a race member 69. This cam controls the movement of valve plunger 59. Although two cams have been shown for the respective plungers, attention is invited to the fact that these two cams could be incorporated in one cam without departing from the principles of this invention. The race members 66 and 69 are securely clamped between shoulders 70 and 71 of a laterally adjustable support 72. This support has a cylindrical bore 73 formed therein but at a prescribed angle to the axis of rotation of the cams.

A vertically movable adjusting member 74 has an internal cylindrical bore 75 by which it is slidably fitted to the rotatable tracer head 76 and an inclined external cylindrical surface 77 complementary to the bore 73 of the support 72 whereby vertical adjustment of the member 74 will effect eccentric or lateral adjustment of the support 72 and associated cams with respect to the axis of rotation of the tracer head.

It will be obvious that the cams must be held against vertical movement in order to effect this adjustment, and to that end the member 72 is provided with an annular flange 78 which is held against the lower face of a gear 79 by a clamping ring 80 which also has a flange that underlaps the flange 78. In other words, the clamping ring merely holds the support in vertical position while permitting the necessary lost motion in a lateral direction to permit eccentric shifting of the cams. The gear 80 is provided for imparting rotation to the cams to change the direction of resultant movement of the supports and therefore in spite of these adjustments, means must be provided for driving the cams.

A key 81 serves to connect the gear to the rotatable tracer head 76 for imparting rotation thereto, and a driving pin 82 is threaded in the gear for engaging a radial slot 83 formed in the top of the cam support 72 for driving it in all positions of adjustment thereof. The key 81 is made long enough to form a splined connection with the adjusting member 74 so that it will rotate with the support 72.

Through the connections thus described the gear 79 is enabled to rotate the two cams and the adjustable supports 72 and 74 as a unit.

Since the support 74 is capable of rotation through 360 degrees, it is provided with an annular groove 84 for receiving its adjusting crank pin 85 which is integral with its supporting shaft 86 mounted in the side wall of the housing. A manual control 87 serves to rotate the shaft and move the adjusting member 74 vertically either up or down to change the length of the radius of eccentricity of the cams. A graduated dial 88 is formed integral with the manual control to indicate the eccentric adjustment of the cams which in effect determines the ultimate feed rate of the machine.

The range of adjustment is limited to this extent that when the adjusting member 74 is in its uppermost position, which is that shown in Figure 1, the cams are centralized with respect to the axis of rotation of the head. With the control cams in this position, the valves are centralized, thus holding both supports against movement. Immediately upon eccentric adjustment of the cams, the valves will be readjusted and movement of the slide or slides will begin. The direction of movement will be in accordance with the orientation of the maximum radius of eccentricity of the cam which is indicated by the reference numeral 89 in Figure 4. It should be clearly understood that the cams are not adjusted through a center position but are adjusted in one direction only from the center position which results in only one radius of maximum eccentricity and that gives the tracer head a directional characteristic which is so desirable because then the rotatable position of the head will indicate and determine the direction of movement.

The length of this radius naturally varies with the amount of eccentric adjustment of the cams whereas the radii 90 and 91 at right angles thereto remain the same or, in other words, equal to the radius of the circular cams. Therefore, whenever either of these radii 90 or 91 are coaxial with either valve, the valve assumes a central position. It will, therefore, be apparent that these two radii mark the crossover point for the valves in which they reverse the direction of movement of the respectively connected slides. With the cams in the position shown in Figure 4, the valve plunger 53 is to the left of its central position while the valve plunger 59 is below its central position, because the radial length of the cam portions in contact with the valves are less than the radii 90, 91. This means that port 32 is connected to port 27 and port 28 is connected to return port 40 and the slide 13 will move toward the right. In the valve 24 the port 31 is connected to port 23 and port 22 is connected to port 39 and the slide 12 will move downward or toward the bottom of the drawings as viewed in Figure 4.

The resultant of these two movements as referred to a cutter means that the cutter moves in the direction of the radius 89 with respect to the work, it being remembered that movement of the table 13 toward the right is the same thing as movement of the cutter toward the left when considered with respect to a work piece on the table. If the cams are rotated clockwise, as viewed in Figure 4, the valve plunger 59 will be moved upward toward a central position, thereby slowing down the movement of the slide 12, while the valve plunger 53 will move toward the left, thereby increasing the pressure differential between channels 25 and 26 causing the slide 13 to move toward the right at an increased rate producing a resultant change in the direction of movement equal to the angular change of position of the cam.

The tracer head 76 is supported by anti-friction bearings 92 located in the bottom of the housing 10 and an anti-friction thrust bearing 93 located in the interior wall 94 of the housing whereby it may be rotated with a minimum amount of friction. A hand wheel 95 is attached to the underside of the tracer head as by screws 96. By means of the hand wheel the eccentric cams may be rotatably positioned to produce any desired direction of movement and the direction of movement is indicated to the operator by an arrow 97 imprinted on one of the spokes 97' of the hand wheel as shown in Figure 4.

Within the end of the tracer head there is inserted a seating member 98 for receiving the truncated sphere 99 which is formed integral with the tracer arm 100. This forms a universal support for the tracer arm and in order to insure that the tracer arm rotates with the tracer head a pin 101 is used to connect them together, the inner end of the pin riding in a slot 102 cut in the periphery of the sphere 99. A connector 103 is attached to the lower end of the tracer arm and provided with bifurcations 104 for receiving the lower portion 105 of the tracer arm, this portion being pivotally connected to the upper portion by a pin 106 passing through the bifurcations. The upper and lower portions of the tracer arm have laterally extending lugs, 107 and 108, in which are threaded screws 109 and 109' which serve to adjust and determine the angular relation between the parts of the tracer arm. In other words, the lower part of the arm is adjusted a small predetermined angular amount out of alignment with the upper part for the purpose of providing a definite amount of anticipation for the tracer arm as it follows a pattern.

The screw 109' is threaded in the upper lug 107 and passes freely through the lower lug 108 and serves to draw the parts together while the screw 109 is threaded in the lower lug and abuts the upper lug to hold the parts separated.

When one part of the tracer arm is angularly adjusted with respect to the other they determine a radial plane and this plane contains the maximum radius of eccentricity of the cams whereby the anticipation lies in the plane of movement. That is why it is necessary to connect the tracer arm to the tracer head by pin 98 in order to change the plane of the tracer arm as the direction of movement changes.

The upper end of the tracer arm seats a ball 110 which is engaged by the lower end of a tracer valve plunger 111. The lower end of the plunger is provided with a concave socket 112 which partially fits over the ball whereby upon deflection of the tracer arm as by a pattern, the plunger 111 is caused to move upward. When the tracer arm is in the vertical position in which it is shown in Figure 1, the tracer valve plunger 111 is in its lowest position. The tracer valve 113, as shown in Figure 4, is provided with two pressure ports 114 and 115 which are connected by branches of channel 34 to the pump 35.

In between these ports is a pair of motor ports 116 and 117 which are connected by channels 118 and 119 to ports 120 and 121 of the selector valve 45. When this valve is in the position shown in Figure 4 the ports 120 and 121 are disconnected from ports 122 and 123 by spools 124 and 125. The ports 122 and 123 are connected by channels 126 and 127 to a hydraulic motor 128. This hydraulic motor is mounted in the tracer housing 10 as shown in Figure 3 and has a pinion gear 129 keyed to the lower end of its drive shaft 130 for actuating through an intermediate gear 131 the gear 79 of the tracer head.

The tracer valve also has an exhaust port 132 which is connected to the reservoir 37 by the line 133. To this port is also connected an exhaust line 134 which has branch connections to the resistances 51 and 52, thus serving to convey the fluid passing through these resistances to reservoir. It should now be evident that with the various valves in the position shown in Figure 4 and with the hydraulic pump 35 running that the two slides will move in accordance with the rotatable position of the control cams and at a rate determined by the amount of eccentric adjustment thereof and that the direction may be changed by rotation of the hand wheel 95.

The chief function of the hand wheel 95 is for setting the direction of movement of the tracer and tool head when the machine is started so that the lower end of the tracer arm will proceed into contact with the edge of the pattern to be reproduced. After contact has been made and with the parts continuing in the same direction, the tracer arm becomes deflected and as the deflection continues the tracer valve plunger 111 is raised to a central position as shown in Figure 5 in which ports 114 and 115 are closed and spool 135 is centralized with respect to exhaust port 132, thereby closing it also. As the valve continues to rise to its upper position, Figure 6, in response to continued movement of the supports, the pressure port 115 is connected to port 117 and port 116 is connected to exhaust port 132. Pressure fluid will now flow through line 119 and branch line 136 to cylinder 137 containing an interlock plunger 138.

As soon as the pressure builds up in cylinder 137 sufficiently to overcome spring 141 the plunger rotates the latch lever 139 which is pivoted in the housing on a pin 140 and held in the position shown by the spring 141. Rotation of the latch lever releases a pawl 142 whereby a spring 143 shifts the selector valve plunger 46 downward to the automatic tracing position. This results in ports 120 and 121 being connected to ports 122 and 123 whereby the tracer valve plunger can now act as a reversing valve to control reversible operation of the hydraulic motor 128.

The plunger 46 in its new position also connects port 44 with port 144, and port 43 with port 145 whereby the exhaust lines from the two slide control valves are now connected through the selector valve to ports 146 and 147 of the tracer valve. An exhaust port 148 is located in the tracer valve intermediate these ports.

When the tracer valve is in its normal working position shown in Figure 5, a spool 149, which is narrower in width than the exhaust port 148, is centralized with respect to this port presenting equal openings on each side thereof, while the ports 146 and 147 are partially uncovered in equal amounts.

When the tracer valve is in the position shown in Figure 6, the spool 149 has moved up sufficiently to close port 148 with respect to port 147, thereby blocking the return line 41 from valve 24 and a spool 150 has moved into position to close port 146, thereby blocking the return line 42 from the valve 29.

Attention is invited to the fact that when the tracer valve passed through the position shown in Figure 5 on its upward movement that the ports 146 and 147 were dead on account of the position of the selector valve, and it is not until the tracer valve has reached the position shown in Figure 6 and effected tripping of the selector valve that the ports 146 and 147 become alive. When they do become alive, the ports are blocked in the manner just described and this causes the pressures in the blocked lines to increase and eventually increase the back pressures in the cylinders until they are equal to the forward pressures whereby the movement of the slides is stopped.

Thus, as soon as the selector valve is tripped it places the tracer control valve in control of reversible operation of the hydraulic motor 128, as well as in control of the return flow from the control valves 24 and 29. The first function of the tracer control valve after being placed in control is to complete automatic engagement of the tracer with the pattern which is accomplished by stopping the movement of the slides and causing rotation of the tracer head into proper tracing position which means changing the direction of movement until it is parallel to the side of the pattern.

It should be clear that as the tracer head rotates, the end of the tracer arm in contact with the pattern is caused to move in a small arc in a direction away from the edge of the pattern and in so doing a spring 151 mounted in the top of the tracer valve housing, as shown in Figure 1, which is continuously acting on the upper end of the tracer valve plunger through a slidable assembly 152 urges the valve downward, thereby slowing down the rotation of the hydraulic motor 128 and starting the movement of the slides. When the valve has reached its normal working position shown in Figure 5, the motor 128 is stopped and the slides are moving at a maximum rate determined by the setting of the rate control lever 87 and the tracer arm 100 is slightly oblique to the vertical axis of the tracer head whereby the lower end of the tracer arm is held in a slight pressural contact with the edge of the pattern and thus ready to respond to an undulation or an eminence on the pattern to cause a change in the direction of movement in accordance with variations in the contour of the pattern.

This makes it possible to obtain automatic control. The tracer control valve is thus held in an intermediate position with the spring 151 continuously acting to urge it downward and the pattern acting on the end of the tracer to restrain the downward movement. Thus, should the tracer meet a depression in the pattern it will permit the tracer control valve to be moved below its central position by the spring 151 causing rotation of the motor 128 in a direction to steer the tracer toward the pattern and simultaneously throttle return flow from the control valves to reduce the rate of slide movement until the necessary change in direction has been effected.

Should the tracer meet an eminence on the pattern, the valve will be moved above its central position, causing the motor to steer the tracer away from the pattern and simultaneously throttle the return flow from the pressural control valves until the necessary change in direction has been effected.

When the profiling operation has been completed the operator manually deflects the tracer to cause rotation of the head in a direction to steer the tracer out of contact with the pattern. Upon release of the tracer the tracer control valve assumes the position shown in Figure 1 in which the port 117 is connected with the exhaust port 132. This releases the pressure in cylinder 137 whereby the selector valve may be manually shifted to its manual control position.

During automatic operation of the machine the latch 153 of the latch lever 139 is held in engagement with the slot 154 cut in the end of the selector valve plunger to prevent inadvertent upward shifting of the selector valve by a manual control 155 shown in Figure 2 which is integrally connected to the pawl 142. This pawl is operatively connected to the selector valve by means of a lug 156 engaging socket 157. When the pressure in cylinder 137 drops sufficiently, which only occurs when the tracer valve is approximately in the position shown in Figure 1, the latch 153 is withdrawn from engagement with the tracer valve by the spring 141 whereby the pawl 142 may be rotated clockwise by the control 155 to reposition the selector valve in the manual control position.

Attention is invited to the fact that the operation of the machine may be stopped at any time regardless of whether the control is automatic or manual by rotating the rate control lever 87 to its stop position. This lever thus operates as a start and stop lever as well as a rate control lever.

Attention is invited to the fact that the hydraulic resistances 51 and 52 connected to ports 47 and 48 are substantially equal in value to the resistances created at the ports 147 and 146 in the tracer valve so that regardless of through which path the exhaust fluid returns to reservoir the resistance characteristics are about the same. It will also be noted that the control valves are held in contact with the cams by springs 86' inserted between the outer ends of the valve plungers and the housing as more particularly shown in Figure 1.

There has thus been provided an improved tracer control mechanism which will function automatically to circumscribe a pattern completely or in other words execute a 360 degree movement.

What is claimed is:

1. In a profiling machine having transversely movable supports for obtaining universal relative movement between a cutting tool and a work piece, the combination with separate fluid operable means for moving each support, of a tracer control mechanism for governing the direction of the resultant movement of said supports including a rotatable tracer head having a directional characteristic, channels for delivering fluid pressure to and conducting returning fluid from the respective fluid operable means, adjustable pressure differentiating throttle valves effective on the fluid in said channels to control the rate and direction of operation of said fluid operable means, and means connecting the valves to the rotatable head for coordinated adjustment thereby to produce a resultant direction of movement corresponding to said directional characteristic.

2. In a tracer control mechanism for an automatic profiling machine having a pair of normally related slides for producing universal relative movement between a cutting tool and a work piece, the combination with fluid operable means for actuating the respective slides, of a casing, a rotatable tracer head having a directional characteristic mounted in the casing, channels for delivering pressure fluid to and conducting return fluid from the respective fluid operable means, adjustable throttle valve means for regulating the flow of fluid in each channel and mounted in the casing in radial relation to the axis of said head, and motion transmitting connections between said valve means and said head for varying the adjustment of the throttle valves upon rotation of the head to produce a resultant movement of the supports in a direction corresponding to said characteristic.

3. A tracer control mechanism for a profiling machine having transversely movable supports for effecting universal movement between a tool and work comprising in combination with separate fluid operable means for the respective supports, of channels for delivering pressure fluid to and conducting return fluid from the respective fluid operable means, a casing, rotatable tracer head mounted in said casing, throttle valve means for each channel effective to throttle the flow to and from said fluid operable means for controlling the pressure differential therebetween and thereby the rate of operation, and cam means carried by the head for adjusting said valves, said head having a directional characteristic whereby orientation of the head determines a prescribed direction of resultant movement of the slides.

4. A tracer control mechanism for a profiling machine having transversely movable supports for effecting universal movement between a tool and work comprising in combination with separate fluid actuable means for the respective supports, of channels for supplying pressure fluid to and conducting returning fluid from the respective fluid actuable means, a casing, a rotatable tracer head mounted in said casing, throttle valve means for each pair of delivery and return channels, said valve means being mounted in said casing in radial relation to said head, said head having a directional characteristic whereby the orientation of the head determines a prescribed direction of resultant movement by the slides, power operable means for rotating said head, a tracer arm oscillatably mounted in said head, and means responsive to oscillation of the tracer arm for causing actuation of said power operable means.

5. In a profiling machine having transversely movable supports for obtaining universal relative movement between a cutting tool and a work piece and separate fluid operable means for moving each support, the combination of a tracer controlled mechanism for governing actuation of said means including a rotatable tracer head having a directional characteristic, pairs of channels for the respective fluid operable means for delivering fluid pressure to and conducting returning fluid from the fluid operable means, adjustable throttle valve means for each pair of channels for controlling the pressure differential therebetween and thus the rate of operation of said fluid operable means, and cam means carried by the rotatable tracer head for varying the adjustment of the several throttle valve means in prescribed phase relation to produce a direction of movement between the tool and work piece which is always in correspondence with said characteristic.

6. In a profiling machine having transversely movable supports for obtaining universal relative movement between a cutting tool and a work piece and separate fluid operable means for moving each support, the combination of a tracer control mechanism for governing the resultant direction of movement of said supports including a rotatable tracer head having a directional characteristic, a pair of channels for each fluid operable means for delivering fluid pressure to and conducting returning fluid therefrom, adjustable throttle valve means for each pair of channels effective to increase the pressure in one channel while decreasing the pressure in the other channel to effect one direction of operation, or conversely to increase the pressure in said other channel and decrease the pressure in said one channel, to effect reverse operation of said fluid operable means and cam means carried by the tracer head for varying the adjustment of the several throttle valve means to produce a resultant direction of movement between the tool and work corresponding to said directional characteristic.

7. In a tracer control mechanism for an automatic profiling machine having a pair of normally related slides for producing universal relative movement between a cutting tool and a work piece, the combination with fluid operable means for the respective slides, of a casing, a rotatable tracer head having a directional characteristic mounted in the casing, adjustable throttle valve means for each fluid operable means mounted in the casing in radial relation to the axis of said head, each throttle valve being adapted to throttle the fluid being delivered to and conducted from the respective fluid operable means, cam means carried by the rotatable tracer head for varying adjustment of the throttle valve means, and resiliently operable means for maintaining said valve means in engagement with said cam means whereby rotation of the tracer head will change the direction of resultant movement between the supports and maintain the direction in correspondence with said characteristic.

8. In a profiling machine having transversely movable supports for obtaining universal relative movement between a cutting tool and a work piece and separate fluid operable pistons for moving each support, the combination of a tracer control mechanism for determining the direction of said movement including a rotatable tracer head having a directional characteristic, pairs of control channels for conducting fluid to and from the opposite sides of said pistons, adjustable throttle valves for throttling the flow through said channels to control the rate of actuation of said pistons, said valves also being adjustable to reverse the direction of operation of said pistons, cam means carried by the tracer head for adjusting said valves in prescribed phase relation to produce a direction of movement corresponding to said characteristic, an oscillatable tracer arm carried by the tracer head, and means responsive to oscillation of the tracer to effect rotation of the cam means and thereby change the direction of resultant movement between the tool and work piece.

9. In a profiling machine having transversely movable supports for obtaining universal relative movement between a cutting tool and work piece, the combination with fluid operable pistons for moving the respective supports, of a tracer controlled mechanism for governing the resultant direction of movement produced by said pistons including a rotatable tracer head having a directional characteristic, pairs of control channels for conducting fluid to and from the respective pistons, adjustable pressure differentiating throttle valves for each pair of channels and operable to make the pressure in one channel greater than the pressure in the second channel to effect one direction of piston operation, or conversely to make the pressure in the second channel greater than the pressure in the first channel to reverse the direction of piston movement, cam means carried by the tracer head for determining the prescribed setting of said different throttle valves to produce a resultant direction of movement corresponding to said characteristic and for changing the setting in response to rotation of the head, an oscillatable tracer arm carried by the head, and means responsive to oscillation of the arm for causing rotation of the head.

10. In a profiling machine having transversely movable supports for obtaining universal relative movement between a cutting tool and a work piece, and separate fluid operable pistons for moving each support, the combination of a tracer control mechanism for governing the resultant direction of movement of the pistons including a rotatable tracer head, each piston having a pair of control channels for conducting pressure fluid to the piston and return fluid from the piston, adjustable pressure differentiating throttle valve means effective on the fluid in the respective channels to control the rate and direction of operation of said pistons, control cam means carried by the head for varying the adjustment of said valve means, said cam means having a point of maximum radius the orientation of which determines the direction of relative movement between the tool and work, an oscillatable tracer carried by the tracer head, and means responsive to oscillation of the tracer for effecting rotation of the head and thereby a change in the orientation of said radius.

11. In a profiling machine having transversely movable supports for obtaining universal relative movement between a cutting tool and a work piece and piston and cylinder motors for moving each support, the combination of a tracer control mechanism for regulating and controlling the direction of the resultant movement of said supports including a rotatable tracer head having a directional characteristic, pairs of control channels connected to opposite ends of each cylinder for conducting fluid to and from opposite sides of the pistons, throttling valve means for regulating the flow in each channel and thus controlling the rate and direction of said pistons, control cam means carried by the head for determining relative adjustment of the various throttle valves, a tracer arm oscillatably supported at a point intermediate its length, means responsive to oscillation of the tracer arm for effecting rotation of the head, one end of said arm having a pattern contacting portion which is pivotally connected to the remaining portion of said arm for adjustment purposes, said arm being connected to the tracer head in a manner that the plane of the tracer arm determines the plane of relative movement between the tool and work.

12. In a profiling machine having transversely movable supports for obtaining universal relative movement between a cutting tool and a work piece and separate hydraulic motors for moving each support, the combination of a tracer control mechanism for determining the rate and direction of said motors including a rotatable tracer head, a pair of channels leading to each motor, each pair of channels having adjustable pressure differentiating valve means for controlling the resultant pressure on said motor for rate determining purposes and the direction of said resultant pressure for direction determining purposes, said valve means being radially arranged with respect to said tracer head, cam means carried by the head, means for maintaining said valve means in engagement with said cam means, said cam means comprising a circular cam eccentrically supported on the head whereby a given position of said head will produce a given rate and direction of movement, and means to adjust the eccentricity of said cam means to change the rate of said movement.

13. In a tracer control mechanism for an automatic profiling machine having a pair of normally related slides for producing universal relative movement between a cutting tool and a work piece, the combination with reversible fluid operable motors for the respective slides, of a casing, a rotatable tracer head mounted in said casing, adjustable throttle valve means for each motor mounted in the casing in radial relation to the axis of said head, a pair of channels connecting each valve to its respective motor, a source of pressure connected to said valves, each valve having means for blocking said channels when the valve is in a central position and other means for throttling the flow through said channels when the valve is to one side or the other of its central position to differentiate the pressure in said channels in accordance with the rate and direction of movement desired, a circular cam eccentrically mounted on the tracer head, said valve plungers being positioned at right angles to one another in said casing and in engagement with the periphery of said cam whereby rotation of said cam will effect inverse adjustment of said throttle valves in a definite phased relation to effect angular changes in the direction of slide movement equal to the angular movements of said cam.

14. In a tracer control mechanism for an automatic profiling machine having a pair of normally related slides for producing universal relative movement between a cutting tool and a work piece, the combination with reversible fluid operable motors for the respective slides, of a casing, a rotatable tracer head mounted in said casing, adjustable throttle valve means for each motor mounted in the casing in radial relation to the axis of said head, a pair of channels connecting each valve to its respective motor, a source of pressure connected to said valves, each valve having means for blocking said channels when the valve is in a central position and other means for throttling the flow through said channels when the valve is to one side or the other of its central position to differentiate the pressures in said channels in accordance with the rate and direction of movement desired, a circular cam eccentrically mounted on the tracer head, said valve plungers being positioned at right angles to one another in said casing and in engagement with the periphery of said cam whereby rotation of said cam will effect inverse adjustment of said throttle valves in a definite phased relation to effect angular changes in the direction of slide movement equal to the angular movements of said cam, a tracer carried by said head and means responsive to deflection of the tracer for effecting rotation of the head.

15. In a tracer control mechanism for a hydraulically operated profiling machine having a plurality of fluid operable devices for effecting different directions of movement between a tool and a work piece, the combination of throttling control valves individual to the respective fluid operable means, a source of pressure connected in parallel to said valves, a pair of channels between each valve and its respective fluid operable means, said valves having plungers which in a central position close said channels to prevent movement of said fluid operable means, said plungers being movable in opposite directions from a central position to effect stepless differentiation of pressures in the respective pairs of channels to cause opposite directions of actuation of the fluid operable means, a rotatable tracer head, cam means carried by the head and effective upon rotation to inversely adjust said plungers and thereby decrease the rate of movement of one of said fluid operable means and increase the rate of the other, an oscillatable tracer carried by said head, and means responsive to deflection of the tracer to effect rotation of the head.

16. In a profiling machine having transversely movable supports for obtaining universal relative movement between a cutting tool and a work piece and separate fluid operable motors for moving each support, the combination of a tracer control mechanism for determining the resultant direction of said motors including a rotatable tracer head, a pressure creating source, a pair of channels for each motor, adjustable hydraulic resistances in each channel, means to adjust said resistances to create prescribed differential pressures in said channels to effect operation of the individual motors, a rotatable tracer head having means thereon for controlling the adjustment of all of said hydraulic resistances in a prescribed phased relation, said control means having a directional characteristic for determining the resultant direction of movement between tool and work, an oscillatable tracer carried by the tracer head, and means responsive to oscillation of the tracer to effect rotation of the head.

17. In a tracer controlled mechanism for a profiling machine having fluid operable slides, the combination of throttle control valves for controlling actuation of the respective slides, a source of fluid pressure for supplying said valves, separate return lines connected to said valves, a rotatable tracer head operatively connected for positioning said valves whereby orientation of the head determines the direction of the feeding movement, manual and power operable means for rotating the head, means for automatically controlling rotation of the head and positioning of the valves including an oscillatable tracer, a tracer controlled valve in said head, a selector valve, means to latch the selector valve in a manual control position, means responsive to oscillation of the tracer for automatically unlatching the selector valve for shifting to an automatic control position, means in the selector valve for coupling the power operable means and said return line to the tracer valve, means in the tracer valve for controlling the reversible operation of the power operable means, and means in the tracer valve for throttling said return line during operation of said power operable means.

18. A tracer control mechanism for a profiling machine having transversely movable supports for effecting universal movement between a work support and a tool support comprising in combination individual fluid operable motors for the respective supports, a source of constant pressure, throttle valves for connecting said source to said motors, a pair of exhaust lines, other throttle valves for throttling the exhaust from said motors to said lines, the throttle valves for the respective motors being connected together for joint adjustment, a rotatable cam having an adjustable fixed eccentricity relative to a fixed axis for effecting adjustment of said throttling means inversely as respects rate, and means controlled by the tracer for effecting rotation of said cam.

19. A tracer control mechanism for a profiling machine having transversely movable supports for effecting universal movement between a work support and a tool support comprising in combination individual fluid operable motors for the respective supports, a source of constant pressure, throttle valves for connecting said source to said motors, a pair of exhaust lines, other throttle valves for throttling the exhaust from said motors to said lines, the throttle valves for the respective motors being connected together for joint adjustment, a rotatable cam having an adjustable fixed eccentricity relative to a fixed axis for effecting adjustment of said throttle means inversely as respects rate, a fluid operable motor for rotating said cam, and means controlled by the tracer for determining the rate and direction of rotation of said motor.

20. A tracer control mechanism for a profiling machine having transversely movable supports for effecting universal movement between a work support and a tool support comprising in combination individual fluid operable motors for the respective supports, a source of constant pressure, throttle valves for connecting said source to said motors, a pair of exhaust lines, other throttle valves for throttling the exhaust from said motors to said lines, the throttle valves for the respective motors being connected together for joint adjustment, a rotatable cam having an adjustable fixed eccentricity relative to a fixed axis for effecting adjustment of said throttling means inversely as respects rate, means controlled by the tracer for effecting rotation of said cam to change the direction of relative movement, and additional means controlled by the tracer for throttling the flow in each of said exhaust channels to decelerate said motors during rotation of the cam without disturbing the setting of said throttle valves.

ERWIN G. ROEHM.